United States Patent

Taya et al.

[11] Patent Number: 4,500,443
[45] Date of Patent: Feb. 19, 1985

[54] BLUE-GREEN EMITTING HALOPHOSPHATE PHOSPHOR

[75] Inventors: Akira Taya, Kawasaki; Kazuo Narita, Tokyo; Masao Asada; Yoshio Kimura, both of Yokohama, all of Japan

[73] Assignee: Tokyo Shibaura Denki Kabushiki Kaisha, Kawasaki, Japan

[21] Appl. No.: 617,940

[22] Filed: Jun. 8, 1984

Related U.S. Application Data

[63] Continuation of Ser. No. 413,243, Aug. 30, 1982, abandoned.

[30] Foreign Application Priority Data

Sep. 3, 1981 [JP] Japan .................................. 56-137837

[51] Int. Cl.³ .......................................... C09K 11/465
[52] U.S. Cl. ............................................ 252/301.4 P
[58] Field of Search ................ 252/301.4 P, 301.68

[56] References Cited

U.S. PATENT DOCUMENTS 4,038,204  7/1977  Wachtel ....................... 252/301.4 P
4,307,321  12/1981  Pappalardo et al. ......... 252/301.4 P
4,353,808  10/1982  Tanimizu et al. ............ 252/301.4 P

OTHER PUBLICATIONS

Murakami et al., "A New Deluxe Fluorescent Lamp With a Color Rendering Index of 99", J. Illum. Engng. Inst. Jpn., vol. 3, No. 1, 1979, pp. 6–11.
Koedam et al., "Measurement and Computer-Aided Optimization of Spectral Power Distributions", Lighting Research and Technology, vol. 3, No. 3, 1971, pp. 205–210.

Primary Examiner—Jack Cooper
Attorney, Agent, or Firm—Schwartz, Jeffery, Schwaab, Mack, Blumenthal & Koch

[57] ABSTRACT

Disclosed is a blue-green emitting halophosphate phosphor activated with divalent europium, which is represented by the general formula:

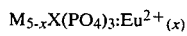

$$M_{5-x}X(PO_4)_3:Eu^{2+}{}_{(x)}$$

wherein M consists of Ba, Ca and Mg, X is one or more of F, Cl or Br, and x is a positive number of less than 5.

4 Claims, 4 Drawing Figures

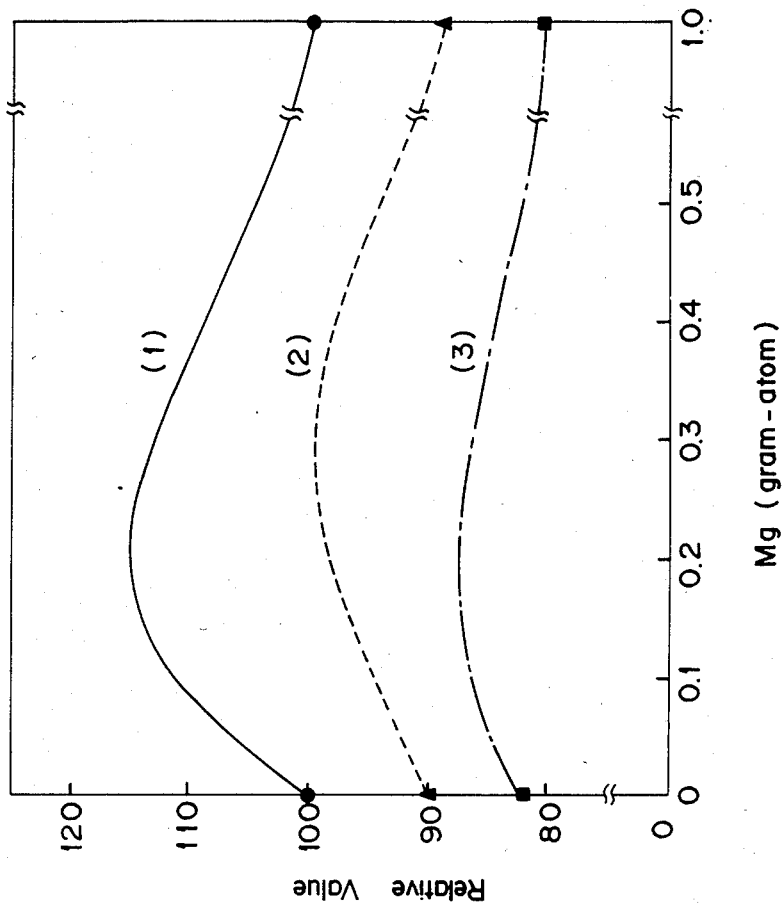

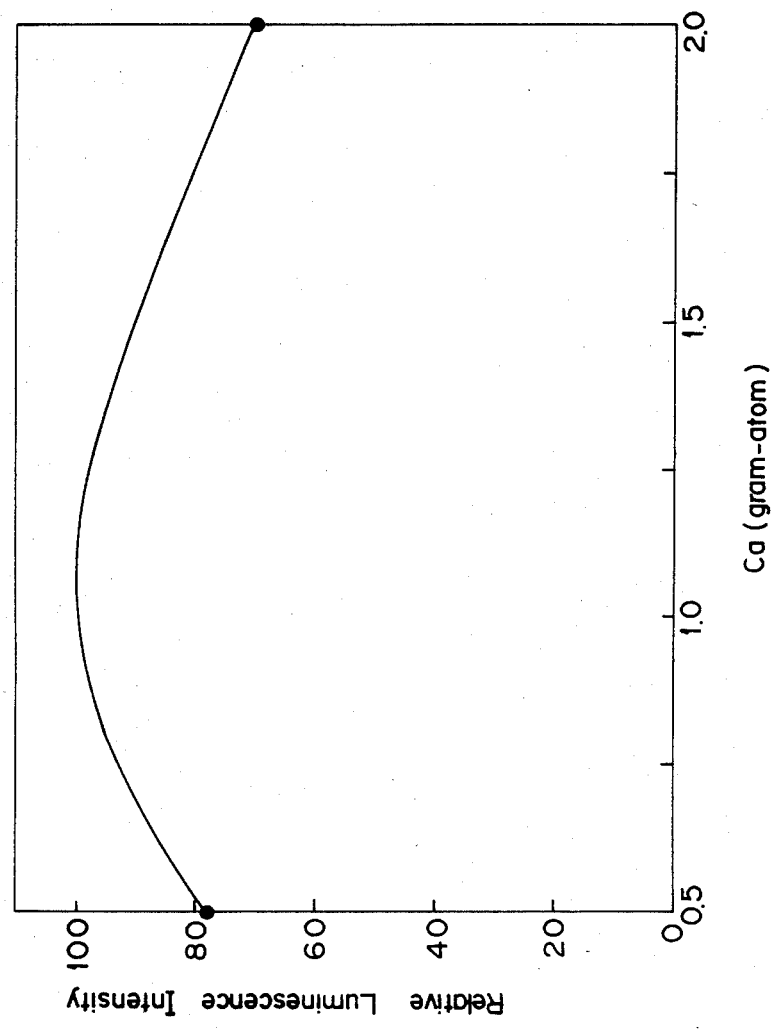

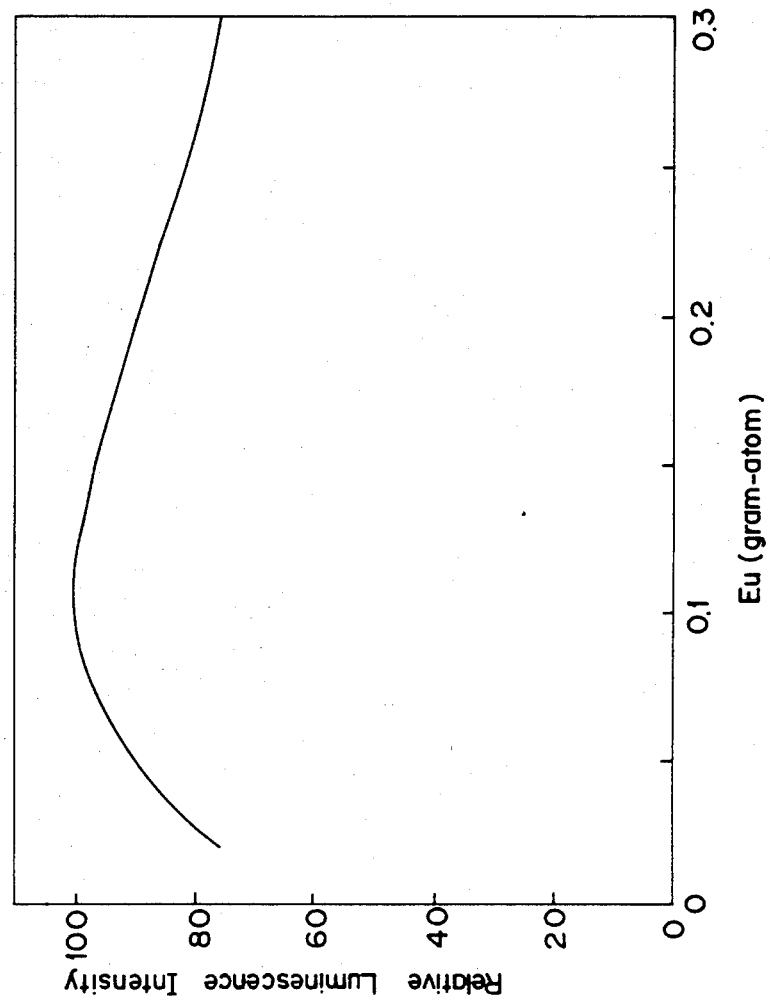

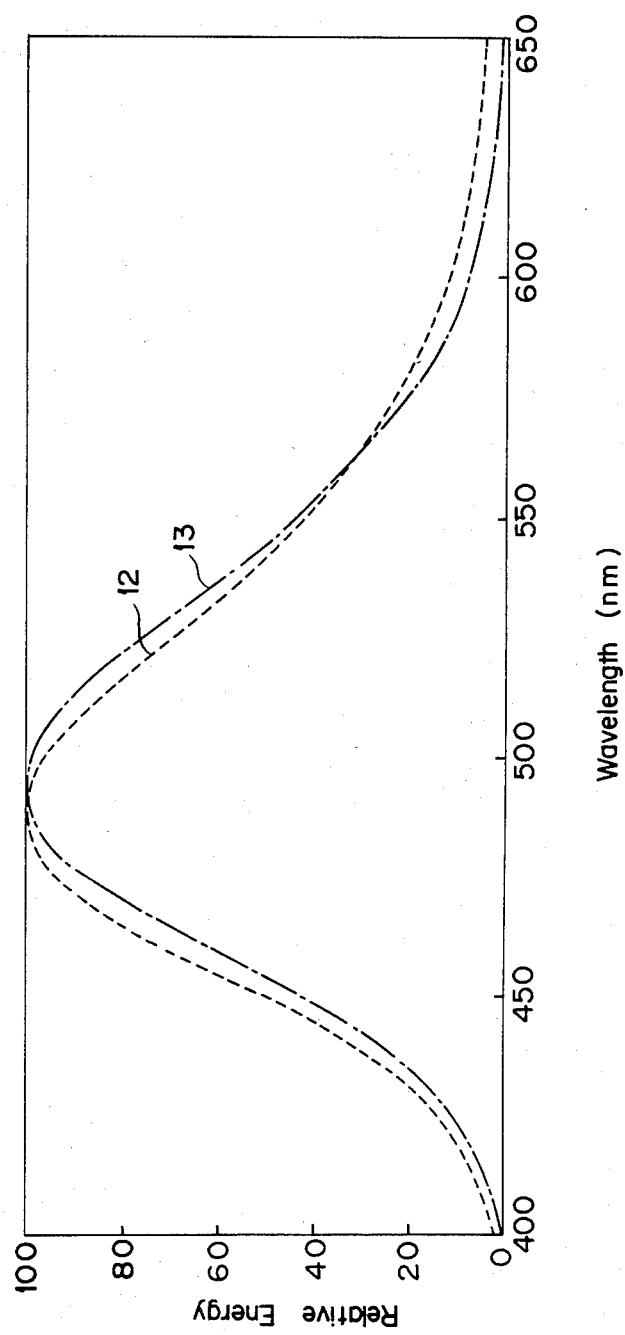

BLUE-GREEN EMITTING HALOPHOSPHATE PHOSPHOR

This application is a continuation of application Ser. No. 413,243, filed Aug. 30, 1982, now abandoned.

BACKGROUND OF THE INVENTION

This invention relates to a blue-green emitting halophosphate phosphor activated with divalent europium.

Heretofore, it is known that halophosphate phosphors activated with divalent europium emit or generate blue or blue-green fluorescence, as disclosed in Japanese Patent Publication No. 40604/1971 and U.S. Pat. No. 4,038,204. These phosphors, however, do not possess a satisfactory efficiency and are known to have such disadvantages as large deterioration in baking process in producing fluorescent lamps, or a poor lumen maintenance factor of produced lamps, when they are applied to fluorescent lamps.

SUMMARY OF THE INVENTION

This invention aims to eliminate the above-mentioned disadvantages and provide phosphors having superior characteristics and emitting blue-green fluorescence. Namely, the invention relates to a halophosphate phosphor activated with divalent europium which is characterized in that it is represented by the general formula:

$$M_{5-x}X(PO_4)_3:Eu^{2+}{}_{(x)}$$

(wherein, M consists of Ba, Ca and Mg; X is one or more of F, Cl or Br; and x is a positive value of less than 5).

The inventors have noted halophosphate phosphors activated with the divalent europium which have the ideal spectral distribution as a blue-green phosphor for the high color rendering fluorescent lamps. As a result of investigations and experiments on the phosphors, the inventors have discovered a Ba-Ca-Mg system halophosphate phosphor activated with divalent europium that possesses superior characteristics as compared with known halophosphate phosphors activated with the divalent europium.

DETAILED DESCRIPTION OF PREFERRED EMBODIMENTS

The inventors have succeeded in obtaining a phosphor having superior characteristics by selecting the value of Mg in M in the range of from 0.01 to 1.0 gram-atom in the above-mentioned general formula:

$$M_{5-x}X(PO_4)_3:Eu^{2+}{}_{(x)}$$

(wherein, M consists of Ba, Ca and Mg; X is one or more of F, Cl and Br; and x is a positive value of less than 5).

In the above general formula, the subscript x denotes the gram-atom value of the divalent europium and is so determined as to satisfy the inequality $0 < x < 5$, preferably $0.01 < x \leq 0.2$. When the subscript x is not more than 0.1, luminescence intensity of the produced phosphor will be severely decreased. When it is more than 0.2, luminescence intensity of a produced phosphor will not remarkably be improved any more. It is more preferable that the value of x is determined to be $0.03 \leq x \leq 0.15$.

Furthermore, M should preferably consist of $3 \sim 4.5$ gram-atom of Ba, $0.5 \sim 2$ gram-atom of Ca and $0.01 \sim 1$ gram-atom of Mg. Where Ba=$3 \sim 4.5$ and Ca=$0.5 \sim 2$, a remarkable improvement in luminescence intensity is not achieved if the substituted amount of Mg is less than 0.01, as opposed to the case where only Ba and Ca are present. Presence of more than 1 gram-atom of Mg will rather lower luminescence intensity. It is more preferable that the amount of Mg is set to be $0.1 \sim 0.5$ gram-atom.

The phosphor of the invention may be prepared in the following manner: Namely, predetermined amount of various compounds such as oxides, phosphates, carbonates and ammonium salts that may form Ba, Ca, Mg, P, F, Cl, Br and Eu by firing are weighed. The material mixture is thoroughly pulverized and mixed, for example, in a ball mill. The mixture is then placed in an alumina or quartz crucible and fired in air for $1 \sim 5$ hours at $800° \sim 1200°$ C. The fired product is allowed to cool, pulverized and sieved, then again fired at $800° \sim 1200°$ C. in a slightly reducing atmosphere of, for example, a mixture of hydrogen and nitrogen.

The twice fired product is allowed to cool, and is then pulverized, sieved, washed, filtered, dried and again sieved to give the phosphor of the invention.

This invention will be explained in more detail by the following Examples, with reference to the accompanying drawings.

BRIEF DESCRIPTION OF THE DRAWINGS

FIG. 1 shows curves indicating the relationship of Mg fraction (expressed in gram-atom) with (1) relative luminescence intensity, (2) maintenance factor A, and (3) maintenance factor B of the phosphor according to the invention;

FIG. 2 shows a curve indicating the relationship of Ca fraction (expressed in gram-atom) with the relative luminescence intensity;

FIG. 3 shows a curve indicating the relationship of Eu fraction (expressed in gram-atom) with relative luminescence intensity; and FIG. 4 shows the spectral energy distributions of emission under 254 nm ultraviolet ray excitation of representative phosphors according to the invention.

EXAMPLE 1

In the phosphor represented by the formula $M_{5-x}X(PO_4)_3:Eu^{2+}{}_{(x)}$ shown in Table 1 infra, X was made to be Cl and x were fixed to be 0.05, whereas M was varied to give the phosphors (Nos. 1–10 in Table 1). For comparison, a conventional phosphor containing no Mg was similarly prepared (No. 21).

Each material mixture was pulverized, blended in a ball mill for 2 hours and then sieved. The mixture was placed in a quartz crucible and fired in air at 950° C. for 3 hours. The fired product obtained in this manner was allowed to cool, pulverized and sieved, then fired again at 950° C. for 1 hour in a mixed gas containing 2% hydrogen and 98% nitrogen.

The fired product was allowed to cool, and was then pulverized, sieved, washed, filtered, dried and sieved again to give the phosphor specimen. Each specimen was confirmed by chemical analysis to have the stoichiometric composition.

The crystal structure of the specimen was confirmed to be a perfect chloroapatite structure by X-ray diffraction pattern analysis. Further, it turned out that the lattice constant has changed in accordance with the mixing ratio of Ba, Ca and Mg.

The specimens thus obtained were tested for (1) relative luminescence intensity, (2) maintenannce factor A, and (3) maintenance factor B. The results are shown in FIG. 1 in correspondence to gram-atom value of Mg admixed.

The tests were performed in the following manner, respectively:

(1) Relative luminescence intensity:

The relative value of luminescence intensity of a specimen when excited by 254 nm ultraviolet radiation in comparison to luminescence intensity (100.0) of control (No. 11 in Table 1) excited in the same manner. The relative value has close correlation to the initial luminous flux when applied to a fluorescent lamps.

(2) Maintenance factor A:

The ratio of luminescence intensity before and after baking in air at 600° C. for 10 minutes expressed by the following formula:

$$\frac{\text{luminescence intensity after baking}}{\text{luminescence intensity before baking}} \times 100(\%).$$

This value can be correlated to the deterioration of luminescence intensity in baking process when fluorescent lamps are produced.

(3) Maintenance factor B:

The ratio of luminescence intensity before and after irradiation of specimen for 4 hours by ultraviolet radiation (containing strong 185 nm line emission) from a quartz low pressure mercury lamp and indicated by the formula:

$$\frac{\text{luminescence intensity after irradiation of ultraviolet ray for 4 hours}}{\text{luminescence intensity without irradiation}} \times 100(\%)$$

This value can be correlated to lumen maintenance factor when applied to fluorescent lamps.

EXAMPLE 2

In the phosphor represented by the formula $M_{5-x}X(PO_4)_3:Eu^{2+}{}_{(x)}$ shown in Table 1 infra, X was made to be Cl and x and Mg were fixed to 0.05 and 0.2, respectively, whereas mixing ratio of Ba and Ca in M was varied to give the phosphors (Nos. 11–14 in Table 1), according to the same procedures as in Example 1.

The specimen were similarly tested for luminescence intensity by 254 nm ultraviolet excitation.

In this case, the figures represent relative luminescence intensity, when that of specimen No. 21 in Table 1 is set for 100.0. The results are shown in FIG. 2 in correspondence to gram-atom values of Ca admixed.

EXAMPLE 3

In the phosphor represented by the formula $M_{5-x}X(PO_4)_3:Eu^{2+}{}_{(x)}$ shown in Table 1 infra, X was made to be Cl and Ca and Mg were fixed to 1.0 and 0.2, respectively, whereas Ba in M and $Eu_{(x)}$ were varied to give the phosphors Nos. 15–20 in Table 1, according to the same procedures as in Example 1. The specimens were similarly tested for luminescence intensity by 254 nm ultraviolet excitation.

In this case, the figures represent relative luminescence intensity, when that of specimen No. 21 in Table 1 (prior art) is set for 100.0. The results are shown in FIG. 3 in correspondence to gram-atom values of Ca admixed.

FIG. 4 shows spectral energy distribution of emission of the phosphors according to the invention (No. 12 and No. 13 in Table 1 according to Example 2 as the representatives) when excited by ultraviolet ray at 254 nm.

TABLE 1

| No. | M (Gram-atom) Ba | Ca | Mg | X (Gram-atom) Cl | x (Gram-atom) Eu | (1) Relative luminescence intensity | (2) Maintenance factor A | (3) Maintenance factor B |
| --- | --- | --- | --- | --- | --- | --- | --- | --- |
| 1 | 3.90 | 1.0 | 0.05 | 1.0 | 0.05 | 106.5 | 92.5 | 85.0 |
| 2 | 3.85 | " | 0.10 | " | " | 111.0 | 94.5 | 86.5 |
| 3 | 3.80 | " | 0.15 | " | " | 114.0 | 96.5 | 87.5 |
| 4 | 3.75 | " | 0.20 | " | " | 115.0 | 98.0 | 87.5 |
| 5 | 3.70 | " | 0.25 | " | " | 114.5 | 99.0 | 87.0 |
| 6 | 3.65 | " | 0.30 | " | " | 113.0 | 99.5 | 86.5 |
| 7 | 3.60 | " | 0.35 | " | " | 111.0 | 99.0 | 86.0 |
| 8 | 3.55 | " | 0.40 | " | " | 108.5 | 98.0 | 84.5 |
| 9 | 3.50 | " | 0.45 | " | " | 106.5 | 96.0 | 83.5 |
| 10 | 3.45 | " | 0.50 | " | " | 104.5 | 94.5 | 82.5 |
| 11 | 4.00 | 0.75 | 0.20 | " | " | 106.5 | 96.0 | 86.0 |
| 12 | 3.75 | 1.0 | " | " | " | 115.0 | 98.5 | 87.5 |
| 13 | 3.50 | 1.25 | " | " | " | 113.0 | 97.5 | 88.0 |
| 14 | 3.25 | 1.5 | " | " | " | 103.5 | 97.0 | 87.5 |
| 15 | 3.77 | 1.0 | " | " | 0.03 | 105.0 | 99.0 | 85.5 |
| 16 | 3.75 | " | " | " | 0.05 | 115.0 | 99.0 | 88.0 |
| 17 | 3.73 | " | " | " | 0.07 | 123.0 | 98.5 | 89.0 |
| 18 | 3.70 | " | " | " | 0.10 | 128.0 | 97.5 | 90.5 |
| 19 | 3.65 | " | " | " | 0.15 | 124.0 | 95.0 | 91.0 |
| 20 | 3.60 | " | " | " | 0.20 | 115.0 | 93.0 | 92.5 |
| 21 | 3.95 | 1.0 | — | 1.0 | 0.05 | 100.0 | 90.0 | 82.0 |

It is evident from the foregoing results that the phosphor according to the invention exhibits a higher luminescence intensity when irradiated by 254 nm ultraviolet radiation, a smaller decrease in luminescence intensity upon baking or by irradiation of 185 nm ultraviolet radiation, as compared with a prior art halophosphate phosphor activated with divalent europium.

It was confirmed that fluorescent lamps having superior characteristics and having high initial luminous flux and lumen maintenance factor may be obtained when the phosphor of the invention is applied to fluorescent lamps.

Thus, as mentioned above, the phosphor according to the invention is useful for fluorescent lamps, especially as a blue-green component of high color rendering fluorescent lamps.

We claim:

1. A blue-green emitting halophosphate phosphor activated with divalent europium, which is represented by the formula $$M_{5-x}X(PO_4)_3:Eu^{2+}{}_{(x)}$$

wherein M consists of about 3 to about 4.5 gram-atom of barium, about 0.5 to about 2 gram-atom of calcium and about 0.01 to about 1 gram-atom of magnesium; X is one or more of fluorine, chlorine and bromine; and x is more than 0.01 and not more than 0.2, said phosphor exhibiting a higher luminescent intensity when irradiated by 254 nm radiation and higher maintenance factors A and B than said phosphor absent magnesium.

2. The phosphor according to claim 1, wherein said Mg is contained in the amount of 0.1 to 0.5 gram-atom.

3. The phosphor according to claim 2, wherein said Mg is contained in the amount of 0.15 to 0.3 gram-atom.

4. The phosphor according to claim 1, wherein X is Cl.

* * * * *